United States Patent [19]

Miro et al.

[11] Patent Number: 4,866,021

[45] Date of Patent: Sep. 12, 1989

[54] CATALYST COMPOSITION FOR PREPARING HIGH DENSITY, BROAD MOLECULAR WEIGHT DISTRIBUTION ALPHA-OLEFIN POLYMERS

[75] Inventors: Nemesio D. Miro, North Brunswick; Thomas E. Nowlin, Somerset, both of N.J.

[73] Assignee: Mobil Oil Corp., New York, N.Y.

[21] Appl. No.: 144,454

[22] Filed: Jan. 15, 1988

[51] Int. Cl.$^4$ .............................................. C08F 4/64
[52] U.S. Cl. ................................ 502/113; 502/110; 502/103; 526/116
[58] Field of Search ............... 502/103, 113, 119, 128, 502/110

[56] References Cited

U.S. PATENT DOCUMENTS

| | | | |
|---|---|---|---|
| 144,821 | 1/1988 | Miro . | |
| 253,803 | 10/1988 | Miro . | |
| 3,135,809 | 6/1964 | Bosmajian | 502/103 X |
| 3,899,477 | 8/1975 | Altemore et al. | 260/94.9 |
| 3,956,255 | 5/1976 | Ort | 526/352 |
| 4,333,851 | 7/1980 | Speakman et al. | 252/429 B |
| 4,396,533 | 8/1983 | Johnstone | 502/113 X |
| 4,508,842 | 4/1985 | Beran et al. | 502/119 X |
| 4,578,374 | 3/1986 | Best | 502/115 |
| 4,579,834 | 4/1986 | Best | 502/115 |
| 4,579,835 | 4/1986 | Best | 502/120 |
| 4,593,009 | 6/1986 | Nowlin | 502/107 |
| 4,607,019 | 8/1986 | Best | 502/119 |
| 4,634,751 | 1/1987 | Best | 526/129 |

*Primary Examiner*—Patrick P. Garvin
*Attorney, Agent, or Firm*—Alexander J. McKillop; Charles J. Speciale; Stanislaus Aksman

[57] ABSTRACT

Broad molecular weight distribution, and high molecular weight olefin polymers, are prepared by polymerizing at least one olefin in the presence of a vanadium - and a titanium-containing catalyst composition. A catalyst precursor is synthesized by contacting a solid, porous carrier sequentially with a metal or a compound of a metal of Group IIB of the Periodic Chart of the Elements, e.g., a zinc compound, a halogen-containing aluminum compound, a vanadium compound and a titanium compound. The precursor is then combined with a suitable co-catalyst and a halogenating agent to produce the catalyst composition used to polymerize olefins.

62 Claims, No Drawings

CATALYST COMPOSITION FOR PREPARING HIGH DENSITY, BROAD MOLECULAR WEIGHT DISTRIBUTION ALPHA-OLEFIN POLYMERS

BACKGROUND OF THE INVENTION

1. Field of the Invention

The present invention relates to a catalyst composition for polymerizing alpha-olefins, a method for producing such a catalyst and to a method of polymerizing alpha-olefins with such a catalyst. More particularly, the invention relates to a high activity catalyst composition which produces high density, high molecular weight alpha-olefin polymers, having a relatively broad molecular weight distribution, and to the polymerization process utilizing such a catalyst composition.

2. Description of the Prior Art

Linear low density polyethylene polymers possess properties which distinguish them from other polyethylene polymers, such as ethylene homopolymers. Certain of these proerties are described by Anderson et al, U.S. Pat. No. 4,076,698. Such polymers are usually prepared from alpha-olefins in the presence of catalysts commonly referred to as Ziegler or Ziegler-Natta catalysts. Such catalysts usually contain various combinations of a magnesium compound, a compound of a transition metal, e.g., titanium or vanadium, and a co-catalyst, e.g., an aluminum alkyl.

Graff, U.S. Pat. No. 4,173,547, Stevens et al, U.S. Pat. No. 3,787,384, Strobel et al, U.S. Pat. No. 4,148,754, and Ziegler, deceased, et al, U.S. Pat. No. 4,063,009, each describe various polymerization processes suitable for producing forms of polyethylene other than linear low density polyethylene, per se.

Stevens et al, U.S. Pat. No. 3,787,384, and Strobel et al, U.S. Pat. No. 4,148,754, describe catalysts prepared by first reacting a support (e.g., silica containing reactive hydroxyl groups) with an organomagnesium compound (e.g., a Grignard reagent) and then combining this reacted support with a tetravalent titanium compound.

Ziegler, deceased, et al, U.S. Pat. No. 4,063,009, describe a catalyst which is the reaction product of an organomagnesium compound (e.g., an alkylmagnesium halide) with a tetravalent titanium compound. The reaction of the organomagnesium compound with the tetravalent titanium compound takes place in the absence of a support material.

A vanadium-containing catalyst, used in conjunction with triisobutylaluminum as a co-catalyst, is disclosed by W. L. Carrick et al in *Journal of American Chemical Society*, Volume 82, page 1502 (1960) and Volume 83, page 2654 (1961).

Altemore et al, U.S. Pat. No. 3,899,477, disclose a catalyst comprising a titanium halide, a vanadium halide and an organoaluminum compound. The catalyst is admixed with a mixture of an alkylaluminum sesquiethoxide and a trialkylaluminum prior to the use thereof in the polymerization of ethylene to produce high molecular weight and broad molecular weight distribution polymers. The catalyst may be supported on a support by preparing a solution or a slurry thereof and admixing it thoroughly with the support.

Ort et al, U.S. Pat. No. 3,956,255, disclose a supported catalyst composition made by depositing on a previously-treated silica gel a compound of vanadium, a trialkylaluminum, and an alkylaluminum alkoxide. The silica must be treated with an alkylaluminum, an alkylaluminum alkoxide or mixtures thereof, since the catalyst made with untreated silica has low activity.

Best, U.S. Pat. No. 4,607,019, discloses an olefin polymerization catalyst composition producing high molecular weight and broad molecular weight distribution polyolefins comprising a vanadium-containing catalyst component and an aluminum alkyl co-catalyst. The vanadium-containing catalyst component is prepared by contacting an inert support with an organoaluminum compound, a halogenating agent and a vanadium compound.

Best, U.S. Pat. Nos. 4,579,835 and 4,634,751, disclose vanadium-based olefin polymerization catalyst compositions comprising a support material, treated with an organoaluminum compound, an acyl halide and a vanadium compound, activated with an aluminum alkyl cocatalyst.

Best, U.S. Pat. Nos. 4,578,374 and 4,579,834, disclose vanadium- and magnesium-containing supported olefin polymerization catalyst compositions.

With some of the catalysts described above, high yields of good quality, high-molecular weight, solid polymers of ethylene and other olefins may be produced. Generally, these are linear polymers of high density, i.e., 0.930 g/cc and above, with the molecular weight of the polymers falling within a wide range from 2,000 to 300,000 and even as high as 3,000,000 or more. The density and molecular weight characteristics of these polymers render them satisfactory for many uses and they have, in fact, in recent years found extensive commercial use in a variety of applications. However, the polymer products obtained are not always suitable for specialty uses because they do not have the desired molecular weight distribution. Generally, high density and high molecular weight polymers are preferred for their superior strength characteristics. However, such polymers tend to have narrow molecular weight distribution which renders them difficult and expensive to process. Conversely, high density polymers having comparatively broad molecular weight distribution are more easily processed but they do not have satisfactory strength properties. A polymer having balanced molecular weight and molecular weight distribution properties would therefore be desirable for use over a wide range of applications.

SUMMARY OF THE INVENTION

A supported alpha-olefin polymerization precursor catalyst composition is synthesized by contacting a slurry of a solid, porous carrier in a solvent with a metal or a compound of a metal of Group IIB of the Periodic Chart of the Elements (published by the FISHER SCIENTIFIC COMPANY, CAT NO. 5-702-10, 1978), e.g., a compound of zinc; contacting the resulting product with an aluminum compound of the formula

$$R_n AlX_{(3-n)} \qquad (I)$$

where R is a $C_1$–$C_{10}$ alkyl group, X is a halogen and n is 1 or 2; contacting the product with a vanadium compound of the formula

$$VO_m X_{(k-2m)}' \qquad (II)$$

where X' is a halogen, m is 0 or 1 and k is 2, 3, 4, or 5; and contacting the product with a titanium compound of the formula TiX$_4$" (III)

where X" is a halogen. The resulting precursor composition is combined with a conventional catalyst activator, e.g., an aluminum alkyl, and a halogenating agent, to produce an active catalyst composition which is used to prepare alpha-olefin polymers having high density (at least 0.930 g/cc), high molecular weight and broad molecular weight distribution.

DETAILED DESCRIPTION OF THE INVENTION

Carrier Materials

Suitable carriers are any solid support materials used to support alpha-olefin polymerization catalyst compositions.

Such carriers include solid, porous materials, such as silica, alumina and combinations thereof, which contain reactive OH groups. The carrier materials may be amorphous or crystalline.

Examples of suitable materials are described by Graff, U.S. Pat. No. 4,173,547, and by Stevens et al., U.S. Pat. No. 3,781,636, the entire contents of both of which are incorporated herein by reference. Polymeric silicas, known as polysiloxanes, can also be used as suitable carrier materials.

The carrier materials may be in the form of particles having a particle size of from about 0.1 micron to about 200 microns, more preferably from about 10 to about 150 microns. Preferably, the carrier material is in the form of spherical particles, e.g., spray dried silica. The internal porosity of the carriers is larger than 0.2 cm$^3$/gr, preferably larger than about 0.6 cm$^3$/gr. The specific surface area of the carriers is larger than about 50 m$^2$/gr, preferably it is about 150 to about 1500 m$^2$/gr. In the most preferred embodiment, the carrier is silica which has been dehydrated by fluidizing it with air and heating at about 800° C. for about 8 to 10 hours to achieve a surface hydroxyl group concentration of about 0.4 millimoles/gram (mmols/gr). The silica of the most preferred embodiment is a high surface area, amorphous silica (surface area of about 330 m$^2$/gr; pore volume of about 1.50 cm$^3$/gram), and it is a material marketed under the tradename of Davison 955 by the Davison Chemical Division of W. R. Grace and Company. The silica is in the form of spherical particles, e.g., as obtained by a spray-drying process.

Internal porosity of carriers can be determined by a BET-technique, described by S. Brunaruer, P. Emmett and E. Teller in *Journal of the American Chemical Society*, 60, pp. 209-319 (1938). Specific surface area of carriers can also be measured in accordance with the aforementioned BET-technique, with the use of the standardized method, as described in *British Standards* BS 4359, Volume 1 (1969).

It is desirable to remove physically bound water from the carrier material prior to contacting the material with water-reactive magnesium compounds. The water removal step may be accomplished by heating the carrier material in an oxygen-containing gas to a temperature of from about 100° C. to an upper limit of temperature represented by the temperature at which a change of state or sintering occurs. Suitable temperatures are about 100° C. to about 1000° C., preferably from about 750° C. to about 850° C., and most preferably about 800° C.

Chemically bound water, e.g., as represented by the presence of the OH groups on the carrier, may be present when the carrier is contacted with a metal or a compound of a metal of Group IIB in accordance with the present invention. Excess OH groups present in the carrier may be removed by heating the carrier, prior to the contacting step, for a sufficient time at a sufficient temperature to accomplish the desired degree of the OH groups removal. For example, a relatively small number of OH groups may be removed by sufficient heating at from about 150° C. to about 250° C., whereas a relatively large number of OH groups may be removed by sufficient heating at at least 500° or 600° C., preferably from about 750° C. to about 850° C. The heating is continued for about 4 to about 16 hours. The amount of the hydroxyl groups in silica may be determined according to the method disclosed by J. B. Peri and L. L. Hensley, Jr., in *J. Phys. Chem.* 72(8), 2926 (1968), the entire contents of which are incorporated herein by reference.

While heating is the most preferred means of removing the OH groups inherently present in many carriers, such as silica, the OH groups may also be removed by other removal means, such as chemical means. For example, a desired proportion of OH groups may be reacted with a suitable chemical agent, such as a hydroxyl reactive aluminum compound, e.g., triethylaluminum.

Catalyst Precursor Synthesis

The carrier is slurried in a non-polar solvent and the resulting slurry is contacted with a metal or a compound of a metal of Group IIB of the Periodic Chart of the Elements. The slurry of the carrier material in the solvent is preferably prepared by introducing the carrier material into the solvent, preferably while stirring, and then heating the mixture, preferably at a reflux temperature. Subsequently, the metal or a compound of the metal of Group IIB is gradually added to the slurry. The metal or a compound thereof may be introduced by itself into the slurry or as a solution in a suitable solvent, sucuh as the non-polar solvent used to prepare a slurry of the carrier.

Suitable non-polar solvents are materials in which the metal or a compound of the metal of Group IIB, the aluminum compound of formula (I), the vanadium compound of formula (II) and the titanium compound of formula (III) are at least partially soluble, and which are liquid at the catalyst synthesis temperature. Preferred non-polar solvents are alkanes, such as hexane, n-heptane, octane, nonane and decane, although a variety of other materials, including cycloalkanes, such as cyclohexane, aromatics, such as benzene and ethylbenzene, may also be used. The most preferred non-polar solvent is hexane. Prior to use, the non-polar solvent should be purified, such as by percolation through silica gel and/or molecular sieves, to remove traces of water, oxygen, polar compounds, and other materials capable of adversely affecting catalyst activity.

In the preferred embodiment of the synthesis of this catalyst it is important to avoid having in the synthesis mixture such amounts of the metal or a compound of the metal of Group IIB which are in excess of those deposited onto the support (carrier), since any excess may react with other synthesis chemicals and precipitate outside of the support, thereby creating the danger of the formation of polymer fines in the polymerization reactor. Therefore, preferably only such an amount of the metal or the compound of a metal of Group IIB is added to the synthesis reaction that will be deposited—physically or chemically—onto the support. The carrier drying temperature affects the number of sites on the carrier available for the Group IIB metal or a compound thereof—the higher the drying temperature the lower the number of sites. Thus, the exact molar ratio of the Group IIB metal or a compound thereof to the carrier will vary and must be determined on a case-by-case basis to assure that only so much of the metal or its compound is added to the solution as will be deposited onto the support without leaving any excess thereof in the solution. Furthermore, it is believed that the molar amount of the metal or its compound deposited onto the support is greater than the molar content of the hydroxyl groups on the support. Thus, the molar ratios given below are intended to serve only as an approximate guideline for the preferred embodiment and the exact amount of the Group IIB metal or its compound is controlled by the functional limitation discussed above, i.e., it must not be greater than that which is deposited onto the support. The amount of the Group IIB metal or compound thereof which is not greater than that deposited onto the support can be determined in any conventional manner, e.g., by adding the metal or its compound to the slurry of the carrier in the solvent, while stirring the slurry, until the metal or its compound is detected as a solution in the solvent.

For example, in the preferred embodiment, for the silica carrier heated at about 200° to about 850° C., the amount of the Group IIB metal or its compound added to the slurry is such that the millimoles of the metal per gram of the carrier is about 0.10 to about 4.00, preferably about 0.10 to about 1.0 and most preferably about 0.4 to about 0.7.

Alternatively, if such an amount of the metal of Group IIB or a compound thereof is added to the synthesis mixture which is in excess of that deposited onto the carrier, the excess must be removed, e.g., by decantation.

The metals of Group IIB used herein are zinc, cadmium or mercury. Suitable compounds of such metals are organic compounds thereof, e.g., dimethyl mercury, diethyl mercury, dimethyl cadmium, diethyl cadmium, organic zinc compounds, e.g., zinc alkyl halides or dialkyl zinc compounds, preferably they are organic zinc compounds, more preferably zinc alkyl halides or zinc dialkyls, wherein each of the alkyl moieties is the same or different group of 1-7 carbon atoms. Diethylzinc is the most preferred compound used in this synthesis step.

After the addition of the metal or a compound thereof is completed, the slurry is contacted with an aluminum compound of the formula (I):

$$R_nAlX_{(3-n)} \qquad (I)$$

where R is a $C_1$–$C_{10}$ alkyl group, preferably a $C_1$–$C_5$ alkyl group, more preferably a $C_1$–$C_3$ alkyl group and most preferably a $C_2$ alkyl group, X is a halogen, preferably Cl or Br, and most preferably Cl, and n is 1 or 2 or 3, preferably 2. Thus, the most preferred aluminum compound is diethyl aluminum chloride. The amount of the compound of the formula (II) is about 0.10 to about 2.0 mmoles of elemental aluminum (Al-derived from the aluminum compound) per gram of carrier, preferably about 0.4 to about 1.0 mmols of Al per gram of carrier, and most preferably about 0.6 to about 1.0 mmoles of Al per gram of carrier. After the addition of the aluminum compound is completed, the slurry is allowed to react for a sufficient time to deposit as much of the aluminum compound onto the carrier as possible. This reaction is preferably conducted at an elevated temperature and most preferably under reflux conditions. Subsequently, the resulting intermediate product is contacted with a vanadium compound of the formula $$VO_mX_{(k-2m)}' \qquad (II)$$

wherein X' is a halogen, preferably Br or Cl, most preferably Cl, m is 0 or 1, preferably 1, and k is 2, 3, 4, or 5, preferably 5. The amount of the vanadium compound added is about 0.4 to about 1.2 mmoles of elemental vanadium (V), derived from the vanadium compound, per gram of carrier, preferably about 0.6 to about 1.0 mmoles of V per gram of carrier, and most preferably about 0.8 to about 1.0 mmoles of V per gram of carrier. After the aforementioned amount of the vanadium compound is added, the resulting slurry is allowed to react for a sufficient time to deposit as much of the vanadium compound as possible onto the silica. This reaction is also preferably conducted under elevated temperature and most preferably under reflux conditions.

After the addition of the vanadium compound is completed, a titanium compound is added to the slurry. The titanium compound is added preferably as a slurry in a non-polar solvent. The titanium compound has the empirical formula $$TiX_4'' \qquad (III)$$

where X'' is a halogen, preferably Cl. The resulting slurry is allowed to react for a sufficient time to deposit as much as possible of the titanium compound onto the silica. This reaction is preferably conducted under elevated temperature and most preferably under reflux conditions. The amount of the titanium compound is such that the molar ratio of elemental titanium (Ti-derived from the titanium compound) per weight of the carrier is about 0.05 to about 0.7, preferably about 0.1 to about 0.35, and most preferably about 0.1 to about 0.25 mmole Ti per gram of carrier. Subsequently, the non-polar solvent is carefully removed by any conventional means, e.g., by evaporation, distillation or decantation, most preferably by distillation, to assure that substantially all of the solid reaction product is retained on the carrier.

The relative proportions of the aluminum, vanadium and titanium compounds of Formulae (I), (II) and (III), respectively, used in the catalyst synthesis are such that the molar ratio of Al:(Ti+V) in the synthesis mixture is about 0.7:1 to about 1.6:1 and preferably about 1:1 to about 1.4:1. It is believed that such ratios produce a catalyst composition which polymerizes alpha-olefins of relatively broad molecular weight distribution (i.e., MFR of about 146 to about 156).

As with the metal or a compound of the metal of Group IIB, in the preferred catalyst synthesis embodiment of this invention, it is important to avoid having in the synthesis mixture such amounts of the aluminum, vanadium and titanium compounds which are in excess of those deposited onto the carrier. Therefore, in the synthesis steps described above utilizing these compounds, preferably only such amounts of the respective compounds are added that will be deposited—physically or chemically—onto the support since any excess thereof in the solution may react with other synthesis chemicals and precipitate outside of the support. The carrier drying temperature may affect the number of sites on the carrier available for the deposition of these compounds—the higher the drying temperature the lower the number of sites. Thus, the exact molar ratios of these compounds to the carrier will vary and must be determined on a case-by-case basis to assure that only so much thereof is added to the solution as will be deposited onto the support without leaving any excess thereof in the solution. Furthermore, it is believed that the molar amount of these compounds deposited onto the support is greater than the molar content of the hydroxyl groups on the support. Thus, the molar ratios given above are intended to serve only as an approximate guideline and the exact amount of the aluminum, vanadium and titanium compounds in the preferred embodiment must be controlled by the functional limitation discussed above, i.e., it must not be greater than that which can be deposited onto the support. If greater than that amount is added to the solvent, the excess may react outside of the carrier, thereby forming a precipitate outside of the support which is detrimental in the synthesis of this catalyst and must be avoided. The respective amounts of these compounds, which are not greater than those deposited onto the support can be determined in any conventional manner, e.g., by adding them to the slurry of the carrier in the solvent, while stirring the slurry, until the presence of the compounds is detected as a solution in the solvent.

Catalyst Activation

The supported catalyst precursor, formed in the multi-step catalyst synthesis procedure described above, is activated with suitable activators, also known as co-cocatalysts or catalyst promoters, and a halogenating agent. The activators are known in the art and they include any of the materials commonly employed as co-catalysts for olefin polymerization catalyst components containing at least one compound of the elements of Groups IB, IIA, IIB, IIIB and IVB of the Periodic Chart of the Elements, published by Fisher Scientific Company, Catalog Number 5-702-10, 1978. Examples of such activators are metal alkyls, hydrides, alkylhydrides, and alkylhalides, such as alkyllithium compounds, dialkylzinc compounds, trialkylboron compounds, trialkylaluminum compounds, alkylaluminum halides and hydrides, and tetraalkylgermanium compounds. Mixtures of the activators may also be employed. Specific examples of useful activators include n-butyllithium, diethylzinc, di-n-propylzinc, triethylboron, triethylaluminum, triisobutylaluminum, tri-n-hexylaluminum, ethylaluminum dichloride, dibromide, and dihydride, isobutyl aluminum dichloride, dibromide, and dihydride, diethylaluminum chloride, bromide, and hydride, di-n-propylaluminum chloride, bromide, and hydride, diisobutylaluminum chloride, bromide and hydride, tetramethylgermanium, and tetraethylgermanium. Organometallic activators which are preferred in this invention are Group IIB metal alkyls and dialkylhalides having 1 to about 20 carbon atoms per alkyl radical. More preferably, the activator is a trialkylaluminum compound having 1to about 6 carbon atoms per alkyl radical. The most preferred activator is triisobutylaluminum. Other activators which can be used herein are disclosed in Stevens et al, U.S. Pat. No. 3,787,384, column 4, line 45 to column 5, line 12, and in Strobel et al, U.S. Pat. No. 4,148,754, column 4, line 56 to column 5, line 59, the entire contents of both patents being incorporated herein by reference.

The organometallic activator is employed in an amount which is at least effective to promote the polymerization activity of the solid component of the catalyst of this invention. Preferably, at least about three parts by weight of activator are employed per part, by weight, of solid catalyst component, although higher ratios, such as 10:1, 25:1, 100:1 or higher, are also suitable and often give highly beneficial results.

The halogenating agent has the empirical formula $$MH_rX_{(p-r)}''' \tag{IV}$$

where M is Si, C, Ge or Sn, preferably Si or C, and most preferably C, X''' is a halogen, preferably Cl or Br, and most preferably Cl, r is 0, 1, 2 or 3, and p is the valence of M. Suitable halogenating agents are methylene chloride, chloroform, carbon tetrachloride, dichlorosilane, trichlorosilane and silicontetrachloride. When M is C, halogenated hydrocarbons containing 1 to 6 carbon atoms can be used such as those identified by tradenames of Freon 11, 12, 14 and Freon 114, available from E. I. DuPont de Nemours and Co. The most preferred halogenating agent is chloroform, $CHCl_3$. The relative molar ratios of the activator to the halogenating agent are about 0.13:1 to about 7.5:1, preferably about 0.5:1 to about 2:1 and most preferably about 1:1. The activation step is preferably conducted by adding the activator and the halogenating agent to the polymerization medium. Care must be exercised when mixing aluminum trialkyls, especially trimethyl- and triethyl-aluminum, with highly chlorinated hydrocarbon components since a potential explosion may occur. In slurry polymerization processes, a portion of the activator and the halogenating agent can be employed to pretreat the polymerization medium if desired.

The catalyst precursor may be activated in situ by adding the activator and the halogenating agent, and the catalyst precursor separately to the polymerization medium. It is also possible to combine the catalyst precursor with the activator and the halogenating agent before the introduction thereof into the polymerization medium, e.g., for up to about 2 hours prior to the introduction thereof into the polymerization medium at a temperature of from about −40° to about 100° C.

It is notable that the catalyst of this invention is synthesized on a support which does not require chemical pretreatment, e.g., with an alkylaluminum or an alkylaluminum alkoxide compound, it does not require an alkoxide activator, e.g., an alkylaluminum sesquiethoxide, the use of acyl halides during the synthesis and is prepared in the absence of magnesium compounds. As is known to those skilled in the art, magnesium compounds were previously considered necessary to produce Ziegler catalysts with an acceptable level of activity. It is therefore surprising that the catalyst of this invention exhibits a high level of activity in the absence of magnesium compounds. It is also surprising that the catalyst of this invention produces polymers having relatively broad molecular weight distribution and good strength properties without the necessity of using alkylaluminum alkoxide compounds during the catalystsynthesis, considered necessary in prior art to produce catalyst compositions capable of polymerizing polymers of broad molecular weight distribution.

Polymerization

Olefins, especially alpha-olefins, may be polymerized with the catalysts prepared according to the present invention by any suitable process. Such processes include polymerizations carried out in suspension, in solution or in the gas phase. Gas phase polymerization reactions are preferred, e.g., those taking place in stirred bed reactors and, especially, fluidized bed reactors.

The molecular weight of the polymer may be controlled in a known manner, e.g., by using hydrogen. With the catalysts produced according to the present invention, molecular weight may be suitably controlled with hydrogen when the polymerization is carried out at relatively low temperatures, e.g., from about 30° to about 105° C. This control of molecular weight may be evidenced by a measurable positive change in melt index ($I_2$) of the polymer produced.

The molecular weight distribution of the polymers prepared in the presence of the catalysts of the present invention, as expressed by the melt flow ratio (MFR) values, varies from about 125 to about 175, preferably about 130 to about 165 and most preferably from about 146 to about 156, for HDPE products having a density of about 0.940 to about 0.965 g/cc, and $I_2$ values of about 0.03 to about 100. As is known to those skilled in the art, such MFR values are indicative of a relatively broad molecular weight distribution of the polymer. As is also known to those skilled in the art, such MFR values are indicative of the polymers especially suitable for high-density, high molecular weight polyethylene film applications since such polymers offer a good balance of superior toughness, stiffness, and tensile strength properties.

MFR is defined herein as the ratio of the high load melt index (HLMI or $I_{21}$) divided by the melt index, i.e., $$MFR = \frac{I_{21}}{I_2}$$

Low MFR values indicate relatively narrow molecular-weight distribution and high MFR values relatively broad molecular weight distribution of the polymers.

The catalysts prepared according to the present invention are highly active and may have an activity of at least about 1200 grams of polyethylene polymer (PE) per gram of catalyst per 100 psi of ethylene in one hour.

The HDPE polymers prepared in accordance with the present invention are usually homopolymers of ethylene but they may also be copolymers of ethylene with low amounts (0.4 to 1.0 mole%) of one or more $C_3$-$C_{10}$ alpha-olefins. Thus, copolymers having two monomeric units are possible as well as terpolymers having three monomeric units. Particular examples of such polymers include ethylene/1-butene copolymers, ethylene/1-hexene copolymers, ethylene/1-octene copolymers, ethylene/4-methyl-1-pentene copolymers, ethylene/1-butene/1-hexene terpolymers, ethylene/-propylene/1-hexene terpolymers and ethylene/-propylene/1-butene terpolymers. When propylene is employed as a comonomer, the resulting polyethylene polymer preferably has at least one other alpha-olefin comonomer having at least four carbon atoms in an amount of at least 1 percent by weight of the polymer. Accordingly, ethylene/propylene copolymers are possible, but not preferred. The most preferred comonomer is hexene-1.

A particularly desirable method for producing linear low density polyethylene polymers according to the present invention is in a fluid bed reactor. Such a reactor and means for operating it are described by Levine et al, U.S. Pat. No. 4,011,382, Karol et al, U.S. Pat. No. 4,302,566, and Nowlin et al, U.S. Pat. No. 4,481,301, the entire contents of all of which are incorporated herein by reference. Polymers prepared in such a reactor contain particles of the catalyst of this invention since the catalyst is not removed from the polymers.

The following Examples further illustrate the essential features of the invention. However, it will be apparent to those skilled in the art that the specific reactants and reaction conditions used in the Examples do not limit the scope of the invention.

The properties of the polymers produced in the Examples were determined by the following test methods:

Density ASTM D-1505-A plaque is made and conditioned for one hour at 100° C. to approach equilibrium crystallinity. Measurement for density is then made in a density gradient column; reported as gms/cc.

Melt Index (MI), $I_2$ ASTM D-1238-Condition E-Measured at 190° C.-reported as grams per 10 minutes (gms/10 min).

Melt Extrusion Rate, $I_5$ ASTM D-1238-Condition G using 5000 grams weight.

High Load Melt Index (HLMI), $I_{21}$ ASTM D-1238-Condition F-Measured at 10.0 times the weight used in the ($I_2$) melt index test above.

$$\text{Melt Flow Ratio (MFR)} = \frac{I_{21}}{I_2}$$

Productivity The polymer produced after each polymerization is dried in a vacuum oven and productivity is calculated by dividing the polymer weight times 100 by weight of the catalyst used, partial pressure of ethylene and the length of polymerization in hours.

EXAMPLE 1

Catalyst Precursor Synthesis 313.9 grams of Davison grade 955 silica, available from W. R. Grace & Co. Davison Chemical Division, Baltimore, MD (previously calcined at 600° C. for 16 hours under a purge of dry nitrogen) was placed in a 3-liter, nitrogen-purged flask containing 1.5-liter dry hexane. The slurry was brought to reflux while stirring and diethylzinc, $Et_2Zn$ (207 mls of a 0.91 molar solution in hexane) was added dropwise, followed by the addition of diethylaluminum chloride, $Et_2AlCl$ (216 mls of 1.45 molar solution in hexane). After refluxing for 1.5 hours, the solids were allowed to settle, and as much solvent as possible was decanted out of the flask. Then 2-liters of dry hexane were added to the flask. A $VOCl_3$ solution (29.7 mls $VOCl_3$ in 200 mls dry hexane) was added into the slurry while the slurry was being stirred. The resulting slurry was brought to reflux and was stirred for one (1) hour. A $TiCl_4$ solution in hexane (8.6 mls $TiCl_4$ in 150 mls dry hexane) was added dropwise into the stirred slurry, and refluxing was continued for 0.5 hour. The solvent was distilled off to produce 381.7 grams of a purple-coloured, free-flowing product. The amount of reagents added, in mmoles per gram of silica, was 0.60 Et$_2$Zn; 1.0 Et$_2$AlCl; 1.00 VOCl$_3$; 0.25 TiCl$_4$.

EXAMPLE 2

Polymerization Reaction

The catalyst precursor of Example 1 was evaluated in a two (2) gallon slurry polymerization reactor. Two polymerization runs were conducted.

In Run 1, to 3.0 liters (1) of pure, dry hexane and 225-ml hexene-1 at 30° C. there was added a 0.95 molar (M) solution of triisobutylaluminum (11 ml, 10.45 mmoles), and 0.0977 g of the precursor of Example 1. 0.37 grams of chloroform was added as an activity modifier. Hydrogen was added into the reactor in a sufficient amount to produce a polymer having high load melt index (I$_{21}$) of 5-9 g/10 min. Ethylene was continuously added in a sufficient amount to maintain 250 psig total reactor pressure at 85° C. The polymerization reaction was conducted for 60 min at these conditions, at which time the ethylene addition was terminated and the reactor was cooled to ambient temperature. After vacuum drying, a total of 255 g of polymer, having a density of 0.948 g/cc was recovered. Run 2 was conducted in the same reactor as Run 1 and in substantially the same manner as Run 1, except more hydrogen was added, and it yielded 352 g of polymer product.

Some of the run conditions and polymer product properties are summarized in Table 1, below:

TABLE 1

| | | Polymerization Results | | | |
|---|---|---|---|---|---|
| Run | I$_{21}$ | MFR | I$_{21}$/I$_5$ | Productivity(*) | Density (g/cc) | H$_2$/C$_2$= (Vapor Mole Ratio) |
| 1 | 5.7 | 156 | 32.2 | 1280 | 0.948 | 0.103 |
| 2 | 7.7 | 146 | 32.7 | 1225 | — | 0.108 |

(*)g polymer/(g catalyst/hr/100 psi ethylene)

The data of Table 1 indicates that the polymers produced with the catalyst of this invention have very broad molecular weight distribution, as evidenced by the high MFR or I$_{21}$/I$_5$ melt ratios.

It will be apparent to those skilled in the art that the specific embodiments discussed above can be successfully repeated with ingredients equivalent to those generically or specifically set forth above and under variable process conditions.

From the foregoing specification, one skilled in the art can readily ascertain the essential features of this invention and without departing from the spirit and scope thereof can adapt it to various diverse applications.

We claim:

1. An olefin polymerization catalyst precursor composition synthesized by a process comprising the steps of:
    (1) contacting a slurry of a solid, porous carrier with an organo metallic compound of a metal of Group IIB of the Periodic Chart of the Elements, wherein the metal is zinc, cadmium or mercury;
    (2) contacting the product of step (1) with an aluminum compound of the formula $$R_nAlX_{(3-n)} \quad (I)$$

where R is a C$_1$-C$_{10}$ alkyl group, X is a halogen and n is 1 or 2;
    (3) contacting the product of step (2) with a vanadium compound of the formula $$[VO_mX'_{(1-2m)}]VO_{\underline{m}}X'_{(k-2m)} \quad (II)$$

where X' is a halogen, k is 2, 3, 4 or 5, and m is 0 or 1; and
    (4) contacting the product of step (3) with a titanium compound of the formula $$TiX''_4 \quad (III)$$

where X'' is a halogen.

2. A precursor composition of claim 1 wherein the organo-metallic compound of a metal of Group IIB used in said step 1 is a compound of zinc.

3. A precursor composition of claim 2 wherein the amount of the compounds of Formulae (I), (II) and (III) used in the synthesis process is such that the molar ratio of Al:(Ti+V) is about 0.7:1 to about 1.6:1.

4. A precursor composition of claim 3 wherein the amount of the compounds of Formulae (I), (II) and (III) used in the synthesis process is such that the molar ratio of Al:(Ti+V) is about 1:1 to about 1.4:1.

5. A precursor composition of claim 4 wherein the compound of zinc is a zinc alkyl or a zinc dialkyl.

6. A precursor composition of claim 5 wherein each of the alkyl moieties in the zinc alkyl or the zinc dialkyl is the same or a different C$_1$-C$_7$ alkyl group.

7. A precursor composition of claim 6 wherein the compound of zinc is diethylzinc.

8. A precursor composition of claim 7 wherein R is a C$_1$-C$_5$ alkyl group.

9. A precursor composition of claim 8 wherein R is a C$_1$-C$_3$ alkyl group.

10. A precursor composition of claim 9 wherein R is an ethyl group.

11. A precursor composition of claim 10 wherein X is Cl or Br.

12. A precursor composition of claim 11 wherein X is Cl and n is 2.

13. A precursor composition of claim 12 wherein X' is Cl or Br.

14. A precursor composition of claim 13 wherein X' is Cl, m is 1 and k is 5.

15. A precursor composition of claim 14 wherein X'' is Cl.

16. An olefin polymerization catalyst composition comprising a precursor of claim 1 combined with a co-catalyst containing at least one organo-metallic compound of elements of Groups IB, IIA, IIB, IIIB or IVB of the Periodic Chart of the Elements and a halogenating agent of the formula $$MH_rX'''_{(p-r)}$$

where M is Si, C, Ge or Sn, X''' is a halogen, r is 0, 1, 2 or 3 and p is the valence of M.

17. A catalyst composition of claim 16 wherein the co-catalyst is a Group IIIB metal alkyl or dialkylhalide having 1 to 20 carbon atoms per alkyl radical.

18. A catalyst composition of claim 17 wherein the co-catalyst is a trialkylaluminum compound having 1 to 6 carbon atoms per alkyl radical.

19. A catalyst composition of claim 18 wherein the co-catalyst is triisobutylaluminum.

20. A catalyst composition of claim 19 wherein in the halogenating agent M is Si or C and X''' is Cl or Br.

21. A catalyst composition of claim 20 wherein the halogenating agent is methylene chloride, chloroform, carbon tetrachloride, dichlorosilane, trichlorosilane or silicontetrachloride.

22. A catalyst composition of claim 21 wherein the halogenating agent is chloroform.

23. A catalyst composition of claim 22 wherein the molar ratios of the co-catalyst to the halogenating agent are about 0.13:1 to about 7.5:1.

24. A catalyst composition of claim 23 wherein the molar ratios of the co-catalyst to the halogenating agent are about 0.5:1 to about 2:1.

25. A catalyst composition of claim 24 wherein the molar ratios of the co-catalyst to the halogenating agent are about 1:1.

26. An olefin polymerization catalyst composition comprising a precursor of claim 15 combined with a co-catalyst containing at least one organo-metallic compound of elements of Groups IB, IIA, IIB, IIIB or IVB of the Periodic Chart of the Elements and a halogenating agent of the formula $$MH_rX'''_{(p-r)}$$

where M is Si, C, Ge or Sn, X''' is a halogen, r is 0, 1, 2 or 3 and p is the valence of M.

27. A catalyst composition of claim 26 wherein the co-catalyst is a Group IIIB metal alkyl or dialkylhalide having 1 to 20 carbon atoms per alkyl radical.

28. A catalyst composition of claim 27 wherein the co-catalyst is a trialkylaluminum compound having 1 to 6 carbon atoms per alkyl radical.

29. A catalyst composition of claim 28 wherein the co-catalyst is triisobutylaluminum.

30. A catalyst composition of claim 29 wherein in the halogenating agent M is Si or C and X''' is Cl or Br.

31. A catalyst composition of claim 30 wherein the halogenating agent is methylene chloride, chloroform, carbon tetrachloride, dichlorosilane, trichlorosilane or silicontetrachloride.

32. A catalyst composition of claim 31 wherein the halogenating agent is chloroform.

33. A catalyst composition of claim 32 wherein the molar ratios of the co-catalyst to the halogenating agent are about 0.13:1 to about 7.5:1.

34. A catalyst composition of claim 33 wherein the molar ratios of the co-catalyst to the halogenating agent are about 0.5:1 to about 2:1.

35. A catalyst composition of claim 34 wherein the molar ratios of the co-catalyst to the halogenating agent are about 1:1.

36. A precursor composition of claim 1 wherein the amount of the metal or a compound of a metal of Group IIB used in said step (1) is such that it is deposited onto the carrier without leaving any excess thereof in the slurry.

37. An olefin polymerization catalyst precursor composition synthesized by a process consisting essentially of the steps of:
(1) contacting a slurry of a solid, porous carrier with an organo-metallic compound of a metal of Group IIB of the Periodic Chart of the Elements, wherein the metal is zinc, cadmium or mercury;
(2) contacting the product of step (1) with an aluminum compound of the formula $$R_nAlX_{(3-n)} \quad (I)$$

where R is a $C_1$–$C_{10}$ alkyl group, X is a halogen and n is 1 or 2;
(3) contacting the product of step (2) with a vanadium compound of the formula $$VO_mX'_{(k-2m)} \quad (II)$$

where X' is a halogen, k is 2, 3, 4 or 5, and m is 0 or 1; and
(4) contacting the product of step (3) with a titanium compound of the formula $$TiX''_4 \quad (III)$$

where X'' is a halogen.

38. A precursor of claim 37 wherein the organo-metallic compound of a metal of Group IIB used in said step 1 is a compound of zinc.

39. A precursor of claim 38 wherein the amount of the compounds of Formulae (I), (II) and (III) used in the synthesis process is such that the molar ratio of Al:(Ti+V) is about 0.7:1 to about 1.6:1.

40. A precursor of claim 39 wherein the amount of the compounds of Formulae (I), (II) and (III) used in the synthesis process is such that the molar ratio of Al:(Ti+V) is about 1:1 to about 1.4:1.

41. A precursor of claim 40 wherein the compound of zinc is a zinc alkyl or a zinc dialkyl.

42. A precursor of claim 41 wherein each of the alkyl moieties in the zinc alkyl or the zinc dialkyl is the same or a different $C_1$–$C_7$ alkyl group.

43. A precursor of claim 42 wherein the compound of zinc is diethylzinc.

44. A precursor of claim 43 wherein R is a $C_1$–$C_5$ alkyl group.

45. A precursor of claim 44 wherein R is a $C_1$–$C_3$ alkyl group.

46. A precursor of claim 45 wherein R is an ethyl group.

47. A precursor of claim 46 wherein X is Cl or Br.

48. A precursor of claim 47 wherein X is Cl and n is 2.

49. A precursor of claim 48 wherein X' is Cl or Br.

50. A precursor of claim 47 wherein X' is Cl, m is 1 and k is 5.

51. A precursor of claim 50 wherein X'' is Cl.

52. An olefin polymerization catalystcomposition containing a precursor of claim 37 combined with a co-catalyst containing at least one organo-metallic compound of elements of Groups IB, IIA, IIB, IIIB or IVB of the Periodic Chart of the Elements and a halogenating agent of the formula $$MH_rX'''_{(p-r)}$$

where M is Si, C, Ge or Sn, X''' is a halogen, r is 0, 1, 2 or 3 and p is the valence of M.

53. A catalyst of claim 52 wherein the co-catalyst is a Group IIIB metal alkyl or dialkylhalide having 1 to 20 carbon atoms per alkyl radical.

54. A catalyst of claim 53 wherein in the halogenating agent M is Si or C and X''' is Cl or Br.

55. A catalyst of claim 54 wherein the co-catalyst is a trialkylaluminum compound having 1 to 6 carbon atoms per alkyl radical.

56. A catalyst of claim 55 wherein the co-catalyst is triisobutylaluminum.

57. A catalyst of claim 56 wherein the halogenating agent is methylene chloride, chloroform, carbon tetrachloride, dichlorosilane, trichlorosilane or silicontetrachloride.

58. A catalyst of claim 57 wherein the halogenating agent is chloroform.

59. A catalyst of claim 58 wherein the molar ratios of the co-catalyst to the halogenating agent are about 0.13:1 to about 7.5:1.

60. A catalyst of claim 59 wherein the molar ratios of the co-catalyst to the halogenating agent are about 0.5:1 to about 2:1.

61. A catalyst of claim 60 wherein the molar ratios of the co-catalyst to the halogenating agent are about 1:1.

62. An olefin polymerization catalyst composition containing a precursor of claim 51 combined with a co-catalyst containing at least one organo-metallic compound of elements of Groups IB, IIA, IIB, IIIB or IVB of the Periodic Chart of the Elements and a halogenating agent of the formula $$MH_rX'''_{(p-r)}$$

where M is Si, C, Ge r Sn, X''' is a halogen, r is 0, 1, 2 or 3, and p is the valence of M.

* * * * *

UNITED STATES PATENT AND TRADEMARK OFFICE
CERTIFICATE OF CORRECTION

PATENT NO. : 4,866,021

DATED : September 12, 1989

INVENTOR(S) : Nemesio D. Miro and Thomas E. Nowlin

It is certified that error appears in the above-identified patent and that said Letters Patent is hereby corrected as shown below:

| | |
|---|---|
| Col. 8, line 21 | delete "silicontetrachloride". insert --silicon tetrachloride--. |
| Col. 13, line 14, Claim 21, line 4 | delete "silicontetrachloride". insert --silicon tetrachloride--. |
| Col. 13, line 51, Claim 31, line 4 | delete "silicontetrachloride". insert --silicon tetrachloride--. |
| Col. 15, line 16, Claim 57, lines 3-4 | delete "silicontetrachloride". insert --silicon tetrachloride--. |

Signed and Sealed this

Thirty-first Day of July, 1990

Attest:

HARRY F. MANBECK, JR.

*Attesting Officer*  *Commissioner of Patents and Trademarks*

UNITED STATES PATENT AND TRADEMARK OFFICE
CERTIFICATE OF CORRECTION

PATENT NO. : 4,866,021

DATED : September 12, 1989

INVENTOR(S) : N. D. Miro and T.E. Nowlin

It is certified that error appears in the above-identified patent and that said Letters Patent is hereby corrected as shown below:

Col. 12, claim 1, Line 2, delete "$[VO_m X'_{(l-2_m)}]$", and the underline in the second formula.

Col. 14, claim 52, Line 60, delete "catalystcomposition" and insert --catalyst composition--.

Signed and Sealed this

Twenty-fourth Day of September, 1991

Attest:

HARRY F. MANBECK, JR.

Attesting Officer

Commissioner of Patents and Trademarks